United States Patent
Otsuki et al.

(10) Patent No.: US 9,225,016 B2
(45) Date of Patent: Dec. 29, 2015

(54) HYDROGEN ABSORBING ALLOY, NEGATIVE POLE, AND NICKEL—HYDROGEN SECONDARY BATTERY

(75) Inventors: Takayuki Otsuki, Kobe (JP); Hiroki Hayashi, Kobe (JP)

(73) Assignee: SANTOKU CORPORATION, Hyogo (JP)

( * ) Notice: Subject to any disclaimer, the term of this patent is extended or adjusted under 35 U.S.C. 154(b) by 69 days.

(21) Appl. No.: 13/817,355

(22) PCT Filed: Aug. 19, 2011

(86) PCT No.: PCT/JP2011/068780
§ 371 (c)(1),
(2), (4) Date: Apr. 4, 2013

(87) PCT Pub. No.: WO2012/023610
PCT Pub. Date: Feb. 23, 2012

(65) Prior Publication Data
US 2013/0202964 A1    Aug. 8, 2013

(30) Foreign Application Priority Data
Aug. 19, 2010   (JP) ................. 2010-200315

(51) Int. Cl.
| | | |
|---|---|---|
| H01M 4/38 | (2006.01) |
| B22F 1/00 | (2006.01) |
| C22C 19/00 | (2006.01) |
| C22C 28/00 | (2006.01) |
| C22F 1/00 | (2006.01) |
| C22F 1/02 | (2006.01) |
| C22F 1/10 | (2006.01) |
| H01M 4/24 | (2006.01) |
| H01M 10/34 | (2006.01) |
| B22F 9/04 | (2006.01) |

(52) U.S. Cl.
CPC ............. *H01M 4/383* (2013.01); *B22F 1/0003* (2013.01); *C22C 19/00* (2013.01); *C22C 19/007* (2013.01); *C22C 28/00* (2013.01); *C22F 1/00* (2013.01); *C22F 1/02* (2013.01); *C22F 1/10* (2013.01); *H01M 4/385* (2013.01); *B22F 2009/045* (2013.01); *C22C 2202/04* (2013.01); *H01M 4/242* (2013.01); *H01M 10/345* (2013.01)

(58) Field of Classification Search
USPC ........................ 429/218.2; 420/416
See application file for complete search history.

(56) References Cited

U.S. PATENT DOCUMENTS

| | | | |
|---|---|---|---|
| 5,008,164 A | 4/1991 | Furukawa et al. | |
| 5,304,345 A | 4/1994 | Fujitani et al. | |
| 5,434,022 A * | 7/1995 | Anani et al. | 429/218.2 |
| 5,654,115 A * | 8/1997 | Hasebe et al. | 429/218.2 |
| 5,753,386 A | 5/1998 | Inaba et al. | |
| 6,074,453 A * | 6/2000 | Anderson et al. | 75/245 |
| 6,261,517 B1 * | 7/2001 | Kaneko et al. | 420/455 |
| 6,375,869 B1 * | 4/2002 | Perng et al. | 252/521.1 |
| 2002/0037453 A1 | 3/2002 | Knosp et al. | |

FOREIGN PATENT DOCUMENTS

| | | |
|---|---|---|
| EP | 0 459 423 A1 | 12/1991 |
| EP | 1 179 868 A1 | 2/2002 |
| JP | 60-230950 A | 11/1985 |
| JP | 02-277737 A | 11/1990 |
| JP | 09-045322 A | 2/1997 |
| JP | 10-102172 A | 4/1998 |
| JP | 2000-234134 A | 8/2000 |
| JP | 2001-279355 A | 10/2001 |
| JP | 2011-127185 A | 6/2011 |

OTHER PUBLICATIONS

Qin Lin et al: Investigation of hydriding properties and structure of $MINi_{5-x}Sn_x$ system Journal of Alloys and Compounds, vol. 351, Jan. 1, 2003 pp. 91-94, XP055102182.

Yuexiang H et al: "Characteristics of a low-cobalt $AB_5$-type hydrogen storage alloy obtained by a gas-atomization processing", Journal of Alloys and Compounds, vol. 305, No. 1-2, Jun. 1, 2000 pp. 76-81, XP004198830.

European Patent Office, Supplementary European Search Report dated Feb. 25, 2014 issued in a corresponding European Patent Application No. 11818250.0.

International Searching Authority, Translation of the International Preliminary Report on Patentability issued in corresponding International Application No. PCT/JP2011/068780, dated Mar. 19, 2013.

* cited by examiner

*Primary Examiner* — Muhammad Siddiquee
(74) *Attorney, Agent, or Firm* — Sughrue Mion, PLLC (57) ABSTRACT

A hydrogen storage alloy wherein elution of Co, Mn, Al, and the like elements into an alkaline electrolyte is inhibited, an anode for a nickel-hydrogen rechargeable battery employing the alloy, and a nickel-hydrogen rechargeable battery having the anode.

9 Claims, 2 Drawing Sheets

HYDROGEN ABSORBING ALLOY, NEGATIVE POLE, AND NICKEL—HYDROGEN SECONDARY BATTERY

FIELD OF ART

The present invention relates to a nickel-hydrogen rechargeable battery, and a hydrogen storage alloy and an anode therefor.

BACKGROUND ART

Nickel-hydrogen rechargeable batteries with an anode containing a hydrogen storage alloy, compared to nickel-cadmium rechargeable batteries, provide higher energy density and pose less environmental burden in the absence of poisonous Cd. Nickel-hydrogen rechargeable batteries have been used in portable appliances such as digital cameras and electric tools, as well as in electric vehicles and hybrid-type electric vehicles, and demanded to provide various battery characteristics depending on their use.

As a conventional anode material for nickel-hydrogen rechargeable batteries, there is well known $LaNi_5$ hydrogen storage alloys having $CaCu_5$ crystals as the main phase, and hydrogen storage alloys wherein Ni in the $LaNi_5$ hydrogen storage alloy is partially substituted with metal elements such as Co, Mn, or Al, are also in use. Such partial substitution of Ni with Co inhibits decrepitation of the alloy and improves cycle characteristics of batteries. Partial substitution of Ni with Mn or Al lowers the equilibrium pressure of the alloy upon hydrogen absorption/desorption, and improves battery capacity.

On the other hand, addition of Co, Mn, Al, or the like elements may result in elution of Co, Mn, and Al into an alkaline electrolyte, and these eluted elements may precipitate on a separator or a cathode to cause micro-short circuit or reduction of the cathode, resulting in self-discharge or a drop in operating voltage of the battery. In particular, Mn, having a higher vapor pressure compared to other metals, evaporates during the melting step in alloy production and segregates near the alloy surface. Consequently, Mn is particularly prone to elution into an alkaline electrolyte.

Addition of Co inhibits decrepitation of the alloy as mentioned above. However, for achieving sufficient effect, addition of a large amount of Co is required, which on the other hand results in increase in the amount of Co elution.

Incidentally, the price of Co metal, which is a rare metal, has recently been increasing and associated alloy cost has also been increasing accordingly.

In view of the above, Patent Publication 1 discloses reduction of a Co content and addition of Sn in a hydrogen storage alloy of the $CaCu_5$ crystal structure to reduce alloy cost and to inhibit decrepitation of the alloy upon absorption/desorption. Patent Publication 1: JP-2001-279355-A The hydrogen storage alloy disclosed in Patent Publication 1 may be inhibited from decrepitation upon absorption/desorption, but the corrosion resistance of the alloy cannot be improved, and elution of Co, Mn, Al, or the like element into an alkaline electrolyte cannot be prevented. In particular, the high Mn content results in a large amount of Mn eluted into an alkaline electrolyte, so that, when the alloy is used in a battery, corrosion resistance, self-discharge characteristics, and operating voltage may be deteriorated.

SUMMARY OF THE INVENTION

It is an object of the present invention to provide a hydrogen storage alloy wherein the Co content is reduced for lowering cost, decrepitation characteristics and oxidation resistance are improved for sufficient corrosion resistance, and significant inhibition of elution of Co, Mn, Al, and the like element into an alkaline electrolyte is achieved, as well as an anode for a nickel-hydrogen rechargeable battery produced with this hydrogen storage alloy.

It is another object of the present invention to provide a nickel-hydrogen rechargeable battery wherein elution of Co, Mn, Al, or the like element from the anode into the alkaline electrolyte is significantly inhibited, deterioration in self-discharge characteristics and operating voltage may be inhibited, and excellent capacity ratio (cycle characteristics) may be achieved.

The present inventors have made intensive researches for achieving the above objects to find out that a hydrogen storage alloy may be obtained which is of low cost, has sufficient corrosion resistance with excellent decrepitation characteristics and oxidation resistance, and allows less elution of Co, Mn, Al, or the like element into an alkaline electrolyte, by regulating in particular the Co, Mn, and Sn contents in a $LaNi_5$ hydrogen storage alloy to fall within a particular alloy composition, and by giving the alloy a structure free of a precipitated phase having a grain diameter of not less than 5.0 µm as observed in a La-mapping image at a magnification of 800× obtained by area analysis of a cross-sectional structure of the alloy with EPMA (Electron Probe Micro Analyzer). The inventors have also found out that, by using this alloy as an anode active material of a nickel-hydrogen rechargeable battery, a battery may be obtained which is of low cost and excellent in cycle characteristics, corrosion resistance (oxidation resistance of the alloy), self-discharge characteristics, and the like, to thereby achieve the present invention.

The inventors have found out that, as will be demonstrated in Comparative Examples 10 to 13 below, in $LaNi_5$ hydrogen storage alloys, particularly with a composition without Sn, no precipitated phase having a grain diameter of not less than 5.0 µm is observed in a La-mapping image at 800× obtained by area analysis of the alloy with EPMA even at a high Mn content, whereas with a composition containing Sn, precipitated phases having a grain diameter of not less than 5.0 µm may be observed in a La-mapping image at 800× obtained by the area analysis of the alloy with EPMA even at a low Mn content. In sum, it is found out that $LaNi_5$ hydrogen storage alloys requisitely containing Sn as in the present invention are prone to have precipitated phases, and thus require controls different from those for the composition without Sn.

According to the present invention, there is provided a hydrogen storage alloy comprising a $CaCu_5$ crystal phase as a main phase, having a composition represented by the formula $RNi_aCo_bAl_cMn_dSn_eM_f$ wherein R stands for at least one element selected from lanthanoid elements including Y, and essentially includes La; M stands for at least one element selected from Ti, Zr, Hf, Ag, Ge, V, Nb, Ta, Cr, Mo, W, Fe, Cu, Zn, B, Ga, Sb, In, Si, P, and C; a satisfies $3.70 \leq a \leq 5.10$, b satisfies $0 < b \leq 0.55$, c satisfies $0.00 \leq c \leq 0.45$, d satisfies $0.00 \leq d < 0.20$, e satisfies $0.05 \leq e \leq 0.25$, and f satisfies $0.00 \leq f \leq 0.25$; and $4.90 \leq a+b+c+d+e+f \leq 5.50$, and having a structure free of a precipitated phase with a grain diameter of not less than 5.0 µm as observed in a La-mapping image at a magnification of 800× obtained by area analysis of a cross-sectional structure of said alloy with EPMA.

According to the present invention, there is also provided an anode for a nickel-hydrogen rechargeable battery comprising the above-mentioned hydrogen storage alloy as an active material.

According to the present invention, there is further provided a nickel-hydrogen rechargeable battery comprising the above-mentioned anode for a nickel-hydrogen rechargeable battery.

The hydrogen storage alloy of the present invention, having the composition and structure as discussed above, is of low cost, has sufficient corrosion resistance with excellent decrepitation characteristics and oxidation resistance, is capable of inhibiting elution of Co, Mn, Al, and the like element into an alkaline electrolyte, and is useful as an anode active material for a nickel-hydrogen rechargeable battery. The nickel-hydrogen rechargeable battery of the present invention, having an anode containing the anode active material mentioned above, is low in cost and excellent in cycle characteristics, corrosion resistance due to inhibition of oxidation, and self-discharge characteristics.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 (a) and (b) are a copy of Sn- and La-mapping images obtained by area analysis of the alloy prepared in Example 10 with EPMA.

FIG. 2 (a) and (b) are a copy of Sn- and La-mapping images obtained by area analysis of the alloy prepared in Example 11 with EPMA.

FIG. 3 (a) and (b) are a copy of Sn- and La-mapping images obtained by area analysis of the alloy prepared in Example 12 with EPMA.

FIG. 4 (a) and (b) are a copy of Sn- and La-mapping images obtained by area analysis of the alloy prepared in Comparative Example 8 with EPMA.

PREFERRED EMBODIMENTS OF THE INVENTION

The present invention will now be explained in detail.

The hydrogen storage alloy according to the present invention contains $CaCu_5$ crystal phases as the main phase, and has a composition represented by the formula $RNi_aCo_bAl_cMn_dSn_eM_f$.

The fact that the alloy contains $CaCu_5$ crystal phases as the main phase may be confirmed, for example, using an X-ray diffractometer (XRD) with Cu-Kα radiation as an X-ray source.

R in the formula representing the composition stands for at least one element selected from the lanthanoid elements including Y, and essentially includes La. That is, R includes La as an essential element, and may optionally include at least one element selected from the lanthanoid elements including Y other than La as an optional element. For example, Mm (misch metal) may be used as R. Mm contains La and two or more elements generally selected from La, Ce, Pr, Nd, Sm, and the like. La tends to lower the equilibrium pressure of the alloy upon hydrogen absorption/desorption, whereas Pr, Nd, Sm and the like tend to increase the equilibrium pressure.

The La content in R is usually not less than 30 mass %, preferably not less than 30 and not more than 85 mass % for good corrosion resistance due to inhibition of oxidation. The Ce content is preferably not less than 5 and not more than 55 mass % for good cycle characteristics and battery capacity. The Pr content is preferably not less than 0.1 and not more than 10 mass % for good cycle characteristics. The Nd content is preferably not less than 0.1 and not more than 15 mass % for good cycle characteristics. According to the present invention, it is preferable to use a mixture of the above-mentioned rare earth elements or Mm of the above-mentioned compositional range.

M in the above-mentioned formula is not always necessary, and may be contained when fine adjustment of characteristics is required depending on the use of the battery. M is at least one element selected from Ti, Zr, Hf, Ag, Ge, V, Nb, Ta, Cr, Mo, W, Fe, Cu, Zn, B, Ga, Sb, In, Si, P, and C. With at least one of Fe, Cu, Zr, Ti, Nb, Mo, W, and B, initial activity is improved and decrepitation is inhibited, or elution of Co, Mn, and Al into an electrolyte is inhibited.

In the formula, a denotes the Ni content with respect to the number of moles of R being 1. The Ni content primarily affects decrepitation characteristics. The amount a satisfies $3.70 \leq a \leq 5.10$, preferably $4.05 \leq a \leq 5.00$. When a is less than 3.70, decrepitation cannot be inhibited, whereas when a is more than 5.10, hydrogen storage capacity may be small.

In the formula, b denotes the Co content with respect to the number of moles of R being 1. The Co content primarily contributes to improvement in decrepitation characteristics. The amount b satisfies $0<b\leq 0.55$, preferably $0<b\ 0.50$, more preferably $0.10\leq b\leq 0.30$. When b is more than 0.55, sufficient initial activity cannot be achieved. With the addition of Sn as will be discussed later, decrepitation characteristics and oxidation resistance are improved, and corrosion resistance is increased. With the addition of Sn, elution of Co, Al, and Mn into an alkaline electrolyte is also inhibited, which effect is realized by synergetic effect of Co and Sn. Thus, when Co is not contained, the cost is low but an effect of the present invention is not achieved.

In the formula, c denotes the Al content with respect to the number of moles of R being 1. The Al content primarily contributes to adjustment of equilibrium pressure upon hydrogen absorption/desorption, and increase in the battery capacity. The amount c satisfies $0\leq c\leq 0.45$. When c is more than 0.45, as-cast alloy cannot be homogenized sufficiently by heat treatment, and a precipitated phase having a higher Al concentration than the matrix may be formed in the alloy structure. Such a precipitated phase, when present, may act as a starting point of cracks, resulting in decrepitation of the alloy and deterioration of cycle characteristics. Further, from such a precipitated phase, Al may be eluted into an alkaline electrolyte to deteriorate self-discharge characteristics and operating voltage of the battery.

In the formula, d denotes the Mn content with respect to the number of moles of R being 1. The Mn content primarily contributes to adjustment of equilibrium pressure upon hydrogen absorption/desorption, and increase in the battery capacity. The amount d satisfies $0\leq d<0.20$. When d is more than 0.20, as with the case of Al, Mn may be eluted into an alkaline electrolyte to deteriorate self-discharge characteristics and operating voltage of the battery. As mentioned above, Mn is particularly prone to elution, but the present invention allows a significantly smaller Mn content compared to that in conventional alloys by controlling the balance with other elements.

In the formula, e denotes the Sn content with respect to the number of moles of R being 1. The Sn content primarily contributes to improvement in decrepitation characteristics and oxidation resistance, which affect corrosion resistance, and to inhibition of elution of Co, Al, and Mn into an alkaline electrolyte to improve cycle characteristics, corrosion resistance, and self-discharge characteristics of the battery. The amount e satisfies $0.05\leq e\leq 0.25$, preferably $0.05\leq e\leq 0.15$. When e is more than 0.25, Sn is eluted into an alkaline electrolyte, whereas when e is less than 0.05, sufficient improvement in corrosion resistance of the alloy and sufficient inhibition of elution of Co, Mn, and Al into an alkaline electrolyte cannot be achieved.

In the formula, f denotes the M content with respect to the number of moles of R being 1. The amount f satisfies $0 \leq f \leq 0.25$. When f is more than 0.25, the various characteristics desired of the hydrogen storage alloy according to the present invention cannot be obtained.

In the formula, a+b+c+d+e+f denotes the total content of the elements other than R with respect to the number of moles of R being 1. The total content of the elements other than R primarily affects decrepitation. The amount a+b+c+d+e+f satisfies $4.90 \leq a+b+c+d+e+f \leq 5.50$, and if less than 4.90, decrepitation cannot be inhibited, whereas if more than 5.50, the hydrogen storage capacity may be small.

In the formula, b+e denotes the sum of the Co and Sn contents. The amount b+e is preferably $0.10 \leq b+e \leq 0.65$, more preferably $0.15 \leq b+e \leq 0.45$. Decrepitation inhibitory effect of Co, of which content is reduced, is supplemented by addition of Sn. When b+e is more than 0.65, the initial activity is low. When b+e is less than 0.10, the cost is low, but decrepitation characteristics are impaired, and improvement in corrosion resistance and inhibition of elution of Co, Mn, and Al into an alkaline electrolyte cannot be achieved.

In the formula, d+e denotes the sum of the Mn and Sn contents. The amount d+e is preferably $0.05 \leq d+e \leq 0.30$, more preferably $0.05 \leq d+e \leq 0.25$. Within this range, when the Sn content is large, elution of Co, Mn, and Al into an alkaline electrolyte is inhibited, whereas when the Mn content is large, large capacity is achieved.

The hydrogen storage alloy according to the present invention has the composition discussed above, and a structure free of a precipitated phase with a grain diameter of not less than 5.0 µm as observed in a La-mapping image at a magnification of 800× obtained by area analysis of a cross-sectional structure of the alloy with EPMA. Determination with EPMA are made at a magnification of 800×, accelerating voltage of 15 kV, current of $1 \times 10^{-7}$ A, and beam diameter of 1 µm. As used herein, the grain diameter of a precipitated phase means the length of the long axis.

The presence/absence of a precipitated phase with a grain diameter of not less than 5.0 µm is determined from a mapping image obtained by area analysis with EPMA under the above-mentioned conditions. The precipitated phase is often formed in the area with high Sn concentration.

When the precipitated phase is observed, the expansion rate is different between the matrix and the precipitated phase upon charging/discharging, which facilitates formation of cracks in the alloy to deteriorate the battery life. Also, in the area with high Sn concentration, elution of Sn itself is facilitated in an alkaline electrolyte and, depending on the Sn concentration distribution, the originally desired inhibitory effect of Sn on the alkaline elution of the other elements (Mn, Co, and Al) may hard to be obtained.

The method for producing the hydrogen storage alloy of the present invention is not particularly limited, and may be a conventional method, for example, strip casting with a single roll, twin rolls, or a disk, or metal mold casting.

In strip casting, first, a raw material is prepared by blending R, Ni, Co, Mn, Al, Sn, and M into a particular composition. Next, the blended raw material is heated to melt in an inert gas atmosphere into an alloy melt at a temperature not less than 100° C. higher than the melting point. Then the alloy melt is poured onto a water-cooled copper roll, rapidly cooled and solidified into alloy flakes.

In metal mold casting, an alloy melt obtained in the same way as above is poured into a water-cooled copper mold, cooled and solidified into an ingot. Strip casting and metal mold casting provide different cooling rates, and strip casting is preferred for conveniently obtaining an alloy with less segregation and uniform composition distribution.

In the above-mentioned production methods, next, the cooled and solidified alloy is heat treated. The heat treatment is performed at 900 to 1200° C. in an inert gas atmosphere. In particular, heat treatment of an alloy obtained by metal mold casting is preferably carried out at not lower than 1050° C. so that the alloy is given a structure which has no precipitated phase with a low La concentration and a grain diameter of not less than 5.0 µm in the area with high Sn concentration. The duration of the heat treatment is about 30 minutes to 10 hours, preferably about 30 minutes to 8 hours. Through such a heat treatment, an alloy is obtained with a structure wherein a majority of Sn is dissolved into the matrix and La is uniformly distributed. As a result, when the alloy is used in a battery, elution of Sn into an alkaline electrolyte is inhibited, and deterioration of self-discharge characteristics and operating voltage of the battery is inhibited.

The anode for a nickel-hydrogen rechargeable battery according to the present invention contains the hydrogen storage alloy of the present invention as an anode active material. Here, the hydrogen storage alloy of the present invention is contained preferably in the form of pulverized powder. The pulverization may be carried out by means of known pulverizing means to give powder having a mean particle diameter (D50) of preferably 10 to 100 µm, more preferably 20 to 80 µm.

The pulverized powder of the hydrogen storage alloy may be subjected to a known treatment before use, for example, plating, surface coating with a high polymer, or surface treatment with acid or alkaline solution, depending on the desired characteristics.

In the anode for a nickel-hydrogen rechargeable battery according to the present invention, the content of the hydrogen storage alloy is preferably not less than 80 mass %, more preferably not less than 95 mass % of the total amount of the materials constituting the anode including an electrically conductive agent and a binder, except for the collector.

The electrically conductive agent may be a known one, such as carbonaceous materials including graphite and carbon black (acetylene black, furnace black, and the like), copper, nickel, and cobalt.

The binder may be a known one, such as carboxymethyl cellulose, polyvinyl alcohol, polyvinyl butyral, polyvinyl pyrrolidone, polyethylene oxide, polytetrafluoroethylene (PTFE), and ethylene tetrafluoride-propylene hexafluoride copolymer (FEP).

The collector may be, for example, punched metal or foam metal. In general, an anode for a nickel-hydrogen rechargeable battery is produced by a so-called paste process, so that punched metal is used. A paste anode may be fabricated by mixing the hydrogen storage alloy of the present invention (in pulverized powder form), the above-mentioned binder, and optionally an electrically conductive agent, antioxidant, surfactant, thickener, and the like, with water as a solvent into a paste, applying and packing the paste onto and into a collector, drying, and roller-pressing.

The anode for a nickel-hydrogen rechargeable battery according to the present invention may have a water repellent layer or an electrically conductive layer formed on its surface as desired. These layers may be formed by known methods. For example, the former may be formed by applying a fluororesin dispersion and the like followed by drying, and the latter may be formed by plating and the like.

The nickel-hydrogen rechargeable battery according to the present invention has the anode for a nickel-hydrogen rechargeable battery of the present invention. The remaining components may be known ones.

The nickel-hydrogen rechargeable battery may be made into various shapes, including cylindrical, laminated, coin-shaped, and the like. In any shape, the nickel-hydrogen rechargeable battery has a package of electrodes made of a laminate of the anode, a separator, and a cathode, which is placed in a container made of stainless steel or the like. When the container is a cylindrical can, the can is usually used as an anode terminal, so that the package of electrodes is rolled into a roll with the anode outside, and inserted into the can to connect the anode with the anode terminal. The cathode is usually connected to a cathode terminal with a lead wire.

The separator may be a non-woven fabric of polymer fibers such as of nylon, polypropylene, or polyethylene, or a porous polymer film such as of polyethylene or polypropylene.

The cathode may contain a nickel oxide, and for example, a non-sintered nickel electrode may be used. A non-sintered nickel electrode may be fabricated by mixing nickel hydroxide and a binder, and optionally cobalt hydroxide, cobalt monoxide, and cobalt metal, with water as a solvent into a paste, packing the paste into a collector such as of foam metal, drying, and roller-pressing.

The container in which the package of electrodes is placed is charged with, for example, a 6N to 8N potassium hydroxide solution as an alkaline electrolyte. The alkaline electrolyte may be those containing lithium hydroxide or sodium hydroxide.

The container is usually equipped with a gasket which seals the battery and a safety valve which is activated when the internal pressure of the battery increases.

EXAMPLES

The present invention will now be explained in detail with reference to Examples and Comparative Examples, which are not intended to limit the present invention.

Example 1

Raw materials were suitably measured out so as to obtain an alloy of the composition shown in Table 1, and melted into an alloy melt in an argon gas atmosphere in a high frequency induction furnace. The pouring temperature of the melt was set to 1450° C., and an alloy ingot of 20 mm thickness was produced using a water-cooled copper mold. The ingot was heat treated at 1100° C. for 7 hours in an argon gas atmosphere, and then pulverized in a stamp mill to obtain alloy powder having a mean particle size (D50) of about 50 μm. The alloy powder was subjected to X-ray diffraction using Cu-Kα radiation as an X-ray source to confirm that the main phase was a $CaCu_5$ crystal phase. It was also confirmed by fluorescent X-ray analysis and ICP that the obtained alloy had the desired composition. A surface of section of the alloy was subjected to area analysis with EPMA at a magnification of 800×, accelerating voltage of 15 kV, current of $1\times10^{-7}$ A, and beam diameter of 1 μm to observe no precipitated phase having a grain diameter of not less than 5.0 μm in a La-mapping image.

[Characteristics Evaluation Tests]

The characteristics of the obtained hydrogen storage alloy (oxidation resistance, decrepitation residual rate, total elution, and capacity ratio) were determined by the following processes.

<Charge/Discharge Cycle Test>

The obtained hydrogen storage alloy was pulverized in a stamp mill to obtain alloy powder having a mean particle diameter (D50) of about 50 μm. 0.15 g of the alloy powder and 0.45 g of carbonyl nickel powder were thoroughly mixed in a mortar, and the resulting mixture was pressed at 2000 kgf/cm² into a pellet of 10 mm in diameter. The pellet was held between nickel mesh sheets, and the periphery of the mesh sheets was spot-welded to press-contact the mesh sheets. A nickel lead wire was spot-welded to the mesh sheets to prepare an anode. The obtained anode and a sintered nickel electrode as a counterelectrode were immersed in a 8N aqueous KOH solution, and subjected to charge/discharge cycle test at 25° C.

The charge/discharge was carried out using a charge/discharge device (manufactured by KEISOKUKI CENTER Co., LTD., trade name BS2500-05R1) by repeating the cycle of charging at a current of 150 mA per 1 g of the hydrogen storage alloy for 170 minutes, taking a break for 10 minutes, and discharging to a mercury oxide electrode at a current of 150 mA per 1 g of the hydrogen storage alloy to −0.7 V.

<Evaluation of Oxidation Resistance>

After the above charge/discharge cycle test was conducted for 100 cycles, the anode alloy pellet was taken out, washed thoroughly with pure water, vacuum dried at 60° C., and measured of the oxygen amount. The oxygen amount was determined using Oxygen Nitrogen Analyzer TCH600 (trade name, manufactured by LECO JAPAN CORPORATION). The obtained oxygen amount was defined as an index of corrosion resistance. The result is shown in Table 2.

<Evaluation of Decrepitation Survival Rate>

The alloy was pulverized in a stamp mill, and the resulting pulverized powder was sieved through 20 μm and 53 μm sieves to obtain powder having a corresponding particle size distribution. The obtained powder was placed in an automated Sieverts-type PCT measuring apparatus (manufactured by TOYOBO ENGINEERING CO., LTD.), and the air was evacuated at 80° C. for 1 hour. The alloy powder was activated by two cycles of hydrogen absorption up to 3 MPa and following evacuation at 80° C. for 30 minutes. Then the alloy powder was subjected to ten cycles of hydrogen absorption up to a hydrogen pressure of 1.3 MPa and desorption down to 0.02 MPa, and the mean particle size of the resulting alloy was determined using a particle size distribution analyzer (manufactured by NIKKISO CO., LTD., trade name "Microtrac MT3000"). The ratio of the alloy particle size determined after the ten cycles of absorption/desorption following the activation with respect to the initial alloy particle size before the activation measured in the same way was determined in percentage as a decrepitation residual rate. The result is shown in Table 2.

<Evaluation of Alkaline Elution>

The alloy was pulverized in a stamp mill to obtain powder having a mean particle diameter (D50) of 50 μm. 5 g of the powder was placed in 50 ml of a 7N aqueous KOH solution, held at 80° C. and left to stand for 7 days to elute the constituent elements of the alloy powder into the aqueous KOH solution. Then the aqueous KOH solution was analyzed by ICP analysis (Induced Couple Plasma Spectroscopy) using a multiple type ICP atomic emission spectrometer (manufactured by THERMO FISHER SCIENTIFIC K.K., trade name "IRIS Advantage") to determine the concentrations of the detected elements. The sum of the eluted amounts of Co, Al, Mn, Sn, and M elements constituting the alloy powder was taken as the total elution. The result is shown in Table 2.

<Evaluation of Capacity Maintenance Rate>
1) Preparation of Anode Plate

To 100 parts by mass of the alloy powder prepared above, 0.4 parts by mass of sodium polyacrylate, 0.1 parts by mass of carboxymethyl cellulose, and 2.5 parts by mass of a polytetrafluoroethylene dispersion (dispersion medium: water; solid content: 60 parts by mass) were added and kneaded to obtain a slurry of an anode material mixture.

The slurry was applied uniformly, i.e., in a uniform thickness, over both sides of a Ni-plated Fe punched metal sheet of 60 μm thickness, and the slurry was dried. Then the punched metal was pressed to cut into an anode plate for a nickel-hydrogen rechargeable battery of AA size.

2) Preparation of Cathode Plate

A mixed aqueous solution of nickel sulfate, zinc sulfate, and cobalt sulfate was prepared so that the ratios of Zn and Co with respect to Ni metal was 3 mass % and 1 mass %, respectively, and an aqueous sodium hydroxide solution was added little by little into this mixed solution under stirring. Here, the pH during the reaction was kept at 13 to 14 to elute nickel hydroxide particles, which were then washed three times with ten folds of pure water, dehydrated, and dried.

The obtained nickel hydroxide particles were mixed with 40 mass % of a HPC dispersion to prepare a slurry of a cathode material mixture. This slurry was packed into a porous nickel substrate and dried, and the substrate was rolled and cut into a cathode plate for a nickel-hydrogen rechargeable battery of AA size.

3) Fabrication of Nickel-Hydrogen Rechargeable Battery

The anode plate and the cathode plate obtained above, with a separator made of a polypropylene or nylon non-woven fabric interposed therebetween, were rolled into a roll to form a package of electrodes, which was then placed in an exterior can. An aqueous potassium hydroxide solution of 30 mass % concentration containing lithium and sodium was poured into this can to fabricate a nickel-hydrogen rechargeable battery of AA size with 2500 mAh capacity.

4) Determination of Capacity Maintenance Rate

The fabricated battery was subjected to measurement of battery capacity by repeating charging at a current of 0.1 C for 16 hours and discharging at a current of 1.0 C down to the final voltage of 0.5 V for 100 cycles. The ratio of the discharge capacity at the 100th cycle to the discharge capacity at the first cycle was determined in percentage as a capacity ratio. The result is shown in Table 2.

Example 2

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1150° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 3

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 4

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1050° C. for 5 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 5

Raw materials were measured out so as to obtain an alloy of the composition shown in Table 1, and melted into an alloy melt in an argon gas atmosphere in a high frequency induction furnace. The pouring temperature of the melt was set to 1500° C., and the melt was casted by strip casting in a single roll casting apparatus with a water-cooled copper roll. The resulting flakes were cooled by a spray of argon gas after the flakes were separated from the cooling roll until the flakes were collected in a steel container. The thickness of the flakes was about 0.3 mm. The obtained flakes were heat treated at 1100° C. for 5 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 6

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1125° C. for 8 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 7

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1075° C. for 8 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 8

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 9

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 10

Figure 1:
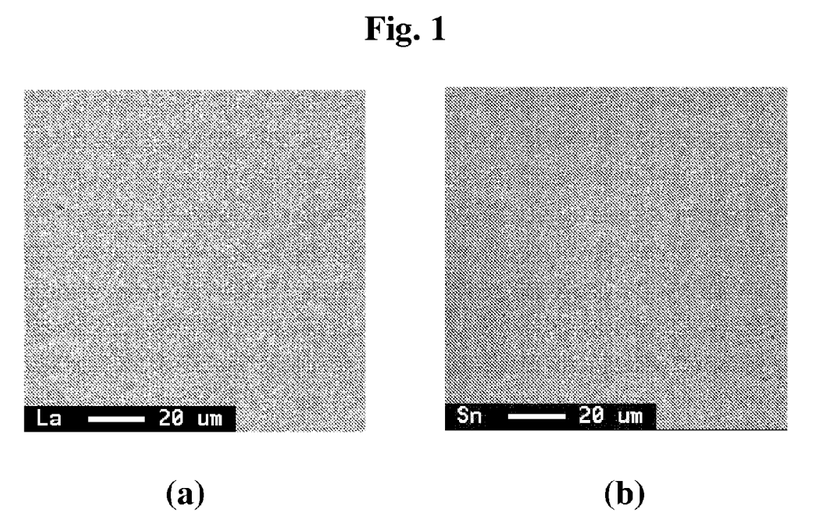

An ingot was prepared in the same way as in Example 1 except that the raw materials were measured out so as to obtain an alloy of the composition shown in Table 1, the pouring temperature was set to 1400° C., and the heat treatment was carried out. The heat treatment of the ingot was carried out at 1050° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. A copy of the La-mapping image obtained by the area analysis with EPMA is shown in FIG. 1 (*a*) and (*b*). Further, the characteristics evaluation tests were conducted in the same way as in Example 1. The results are shown in Table 2.

Example 11

Figure 2:
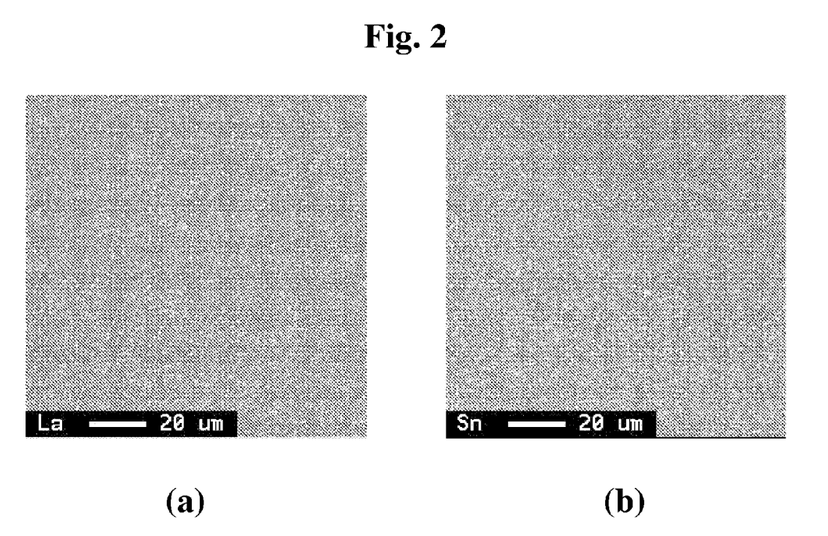

Flakes were prepared in the same way as in Example 5 except that the raw materials were measured out so as to obtain an alloy of the composition shown in Table 1, the pouring temperature was set to 1400° C., and the heat treatment was carried out. The heat treatment of the flakes was carried out at 1050° C. for 7 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. A copy of the La-mapping image obtained by the area analysis with EPMA is shown in FIG. 2 (*a*) and (*b*). Further, the characteristics evaluation tests were conducted in the same way as in Example 1. The results are shown in Table 2.

Example 12

Figure 3:
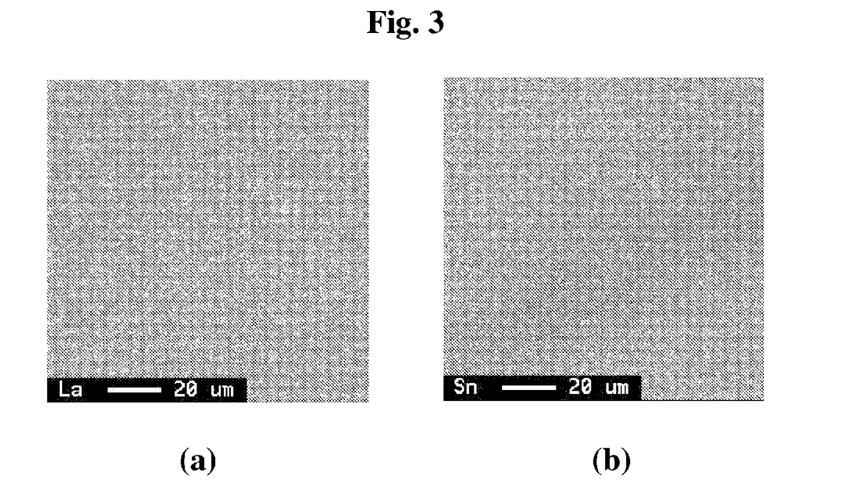

Flakes were prepared in the same way as in Example 11, and heat treated at 1000° C. for 7 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. A copy of the La-mapping image obtained by the area analysis with EPMA is shown in FIG. 3 (*a*) and (*b*). Further, the characteristics evaluation tests were conducted in the same way as in Example 1. The results are shown in Table 2.

Example 13

Flakes were prepared in the same way as in Example 5 except that the raw materials were measured out so as to obtain an alloy of the composition shown in Table 1, the pouring temperature was set to 1550° C., and the heat treatment was carried out. The heat treatment of the flakes was carried out at 1150° C. for 7 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 14

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 15

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 16

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1100° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 17

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1050° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 18

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1100° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 19

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 20

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1100° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 21

An ingot was prepared in the same way as in Example 1 except that the raw materials were measured out so as to obtain an alloy of the composition shown in Table 1, the pouring temperature was set to 1550° C., and the heat treatment was carried out. The heat treatment of the ingot was carried out at 1125° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 22

An ingot was prepared in the same way as in Example 1 except that the raw materials were measured out so as to obtain an alloy of the composition shown in Table 1, the pouring temperature was set to 1550° C., and the heat treatment was carried out. The heat treatment of the ingot was carried out at 1125° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 23

An ingot was prepared in the same way as in Example 1 except that the raw materials were measured out so as to obtain an alloy of the composition shown in Table 1, the pouring temperature was set to 1400° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 24

An ingot was prepared in the same way as in Example 1 except that the raw materials were measured out so as to obtain an alloy of the composition shown in Table 1, the pouring temperature was set to 1400° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 25

An ingot was prepared in the same way as in Example 1 except that the raw materials were measured out so as to obtain an alloy of the composition shown in Table 1, the pouring temperature was set to 1400° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 26

An ingot was prepared in the same way as in Example 1 except that the raw materials were measured out so as to obtain an alloy of the composition shown in Table 1, the pouring temperature was set to 1400° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 27

Flakes were prepared in the same way as in Example 5 except that the raw materials were measured out so as to obtain an alloy of the composition shown in Table 1, the pouring temperature was set to 1400° C., and the heat treatment was carried out. The heat treatment of the flakes was carried out at 1075° C. for 7 hours in an argon gas atmosphere. The obtained flakes were subjected the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 28

An ingot was prepared in the same way as in Example 1 except that the raw materials were measured out so as to obtain an alloy of the composition shown in Table 1, the pouring temperature was set to 1400° C., and the heat treatment was carried out. The heat treatment of the ingot was carried out at 1075° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Example 29

Flakes were prepared in the same way as in Example 5 except that the raw materials were measured out so as to obtain an alloy of the composition shown in Table 1, the pouring temperature was set to 1400° C., and the heat treatment was carried out. The heat treatment of the flakes was carried out at 1075° C. for 7 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 1

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1050° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 2

Flakes were prepared in the same way as in Example 5 except that the raw materials were measured out so as to obtain an alloy of the composition shown in Table 1, the pouring temperature was set to 1550° C., and the heat treatment was carried out. The heat treatment of the flakes was carried out at 1075° C. for 7 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and precipitated phases having a grain diameter of not less than 5.0 μm were observed in a La-mapping image obtained by the area analysis with EPMA. Further, the characteristics evaluation tests were conducted in the same way as in Example 1. The results are shown in Table 2.

Comparative Example 3

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1100° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and precipitated phases having a grain diameter of not less than 5.0 μm were observed in a La-mapping image obtained by the area analysis with EPMA. Further, the characteristics evaluation tests were conducted in the same way as in Example 1. The results are shown in Table 2.

Comparative Example 4

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1050° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 5

An ingot was prepared in the same way as in Example 1 except that the raw materials were measured out so as to obtain an alloy of the composition shown in Table 1, the pouring temperature was set to 1450° C., and the heat treatment was carried out. The heat treatment of the ingot was carried out at 1100° C. for 7 hours in an argon gas atmosphere. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 6

Flakes were prepared in the same way as in Example 5 except that the raw materials were measured out so as to obtain an alloy of the composition shown in Table 1, the pouring temperature was set to 1450° C., and the heat treatment was carried out. The heat treatment of the flakes was carried out at 1025° C. for 7 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 7

An ingot was prepared in the same way as in Example 1 except that the raw materials were measured out so as to obtain an alloy of the composition shown in Table 1, and the pouring temperature was set to 1450° C. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 8

Figure 4:
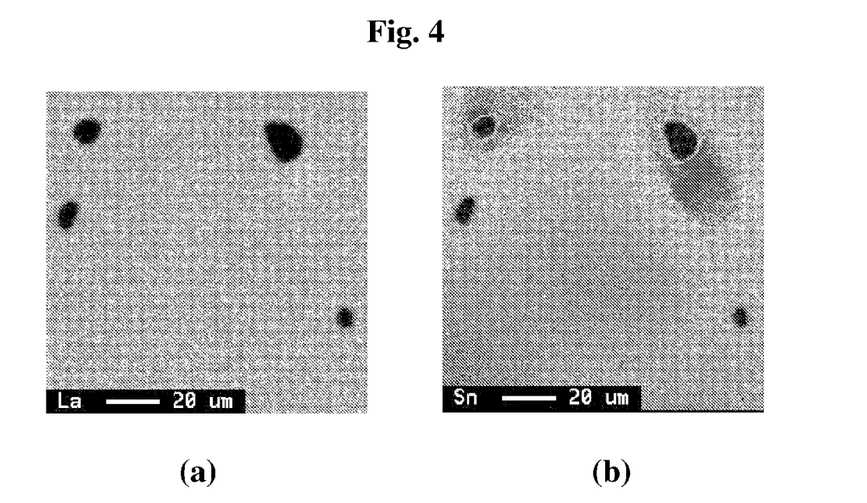

An ingot was prepared in the same way as in Example 10 except that the heat treatment of the obtained ingot was carried out at 1000° C. for 7 hours. The obtained ingot was subjected to the analyses in the same way as in Example 1 to confirm that the main phase was a $CaCu_5$ crystal phase. It was also confirmed that the obtained alloy had the desired composition, and precipitated phases having a grain diameter of not less than 5.0 μm were observed in a La-mapping image obtained by the area analysis with EPMA. The Sn- and La-mapping images obtained by the area analysis with EPMA are shown in FIG. 4 (a) and (b). Further, the characteristics evaluation tests were conducted in the same way as in Example 1. The results are shown in Table 2.

Comparative Example 9

An ingot was prepared in the same way as in Example 1 except that the raw materials were measured out so as to obtain an alloy of the composition shown in Table 1 and the pouring temperature was set to 1450° C. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 10

An ingot was prepared in the same way as in Example 1 except that the raw materials were measured out so as to obtain an alloy of the composition shown in Table 1. The obtained ingot was subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 11

Flakes were prepared in the same way as in Example 5 except that the raw materials were measured out so as to obtain an alloy of the composition shown in Table 1. The flakes were heat treated at 1050° C. for 6 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and no precipitated phase having a grain diameter of not less than 5.0 μm was observed in a La-mapping image obtained by the area analysis with EPMA. Further, the characteristics evaluation tests were conducted in the same way as in Example 1. The results are shown in Table 2.

Comparative Example 12

An ingot was prepared in the same way as in Example 1 except that the raw materials were measured out so as to obtain an alloy of the composition shown in Table 1. The obtained ingot was subjected to the analyses in the same way as in Example 1 to confirm that the main phase was a $CaCu_5$ crystal phase. It was also confirmed that the obtained alloy had the desired composition, and precipitated phases having a grain diameter of not less than 5.0 μm were observed in a La-mapping image obtained by the area analysis with EPMA. Further, the characteristics evaluation tests were conducted in the same way as in Example 1. The results are shown in Table 2.

Comparative Example 13

Flakes were prepared in the same way as in Example 5 except that the raw materials were measured out so as to obtain an alloy of the composition shown in Table 1. The flakes were heat treated at 1050° C. for 6 hours in an argon gas atmosphere. The obtained flakes were subjected to the analyses in the same way as in Example 1 to confirm that the main phase was a $CaCu_5$ crystal phase. It was also confirmed that the obtained alloy had the desired composition, and precipitated phases having a grain diameter of not less than 5.0 μm were observed in a La-mapping image obtained by the area analysis with EPMA. Further, the characteristics evaluation tests were conducted in the same way as in Example 1. The results are shown in Table 2.

TABLE 1

| | Amounts of rare earth components in R (wt %) | | | | Content of each element with respect to R being 1 | | | | | | | | | | | | a + b + c + d + e + f | Production method |
|---|---|---|---|---|---|---|---|---|---|---|---|---|---|---|---|---|---|---|
| | La | Ce | Pr | Nd | a [Ni] | b [Co] | c [Al] | d [Mn] | e [Sn] | Fe | Cu | Ti | Zr | Nb | b + e | d + e | | |
| Ex. 1 | 66.00 | 24.28 | 2.43 | 7.29 | 4.25 | 0.30 | 0.40 | 0.05 | 0.10 | — | — | — | — | — | 0.40 | 0.15 | 5.10 | Metal mold |
| Ex. 2 | | | | | 4.25 | 0.30 | 0.40 | 0.10 | 0.05 | — | — | — | — | — | 0.35 | 0.15 | 5.10 | Metal mold |
| Ex. 3 | | | | | 4.40 | 0.15 | 0.40 | 0.05 | 0.10 | — | — | — | — | — | 0.25 | 0.15 | 5.10 | Metal mold |
| Ex. 4 | 67.00 | 23.57 | 2.36 | 7.07 | 4.25 | 0.30 | 0.40 | 0.00 | 0.10 | — | — | — | — | — | 0.40 | 0.10 | 5.05 | Metal mold |
| Ex. 5 | 61.70 | 27.14 | 2.77 | 8.39 | 4.25 | 0.30 | 0.40 | 0.19 | 0.10 | — | — | — | — | — | 0.40 | 0.29 | 5.24 | SC |
| Ex. 6 | 59.00 | 29.28 | 2.93 | 8.79 | 4.25 | 0.30 | 0.40 | 0.05 | 0.15 | — | — | — | — | — | 0.45 | 0.20 | 5.15 | Metal mold |
| Ex. 7 | | | | | 4.40 | 0.15 | 0.40 | 0.05 | 0.05 | — | — | — | — | — | 0.20 | 0.10 | 5.05 | Metal mold |
| Ex. 8 | 54.00 | 32.85 | 3.29 | 9.86 | 4.45 | 0.10 | 0.40 | 0.05 | 0.10 | — | — | — | — | — | 0.20 | 0.15 | 5.10 | Metal mold |
| Ex. 9 | 30.00 | 51.71 | 4.38 | 13.91 | 4.40 | 0.15 | 0.40 | 0.05 | 0.10 | — | — | — | — | — | 0.25 | 0.15 | 5.10 | Metal mold |
| Ex. 10 | 80.00 | 16.49 | 0.88 | 2.63 | 4.15 | 0.30 | 0.30 | 0.15 | 0.15 | — | — | — | — | — | 0.45 | 0.30 | 5.05 | Metal mold |
| Ex. 11 | 80.00 | 16.49 | 0.88 | 2.63 | 4.15 | 0.30 | 0.30 | 0.15 | 0.15 | — | — | — | — | — | 0.45 | 0.30 | 5.05 | SC |
| Ex. 12 | 80.00 | 16.49 | 0.88 | 2.63 | 4.15 | 0.30 | 0.30 | 0.15 | 0.15 | — | — | — | — | — | 0.45 | 0.30 | 5.05 | SC |
| Ex. 13 | 67.00 | 23.57 | 2.36 | 7.07 | 4.40 | 0.50 | 0.40 | 0.05 | 0.15 | — | — | — | — | — | 0.65 | 0.20 | 5.50 | SC |

TABLE 1-continued

| | Amounts of rare earth components in R (wt %) | | | | Content of each element with respect to R being 1 | | | | | | | | | | a + b + e | d + e | a + b + c + d + e + f | Production method |
|---|---|---|---|---|---|---|---|---|---|---|---|---|---|---|---|---|---|---|
| | | | | | | b | | d | e | f [M elements] | | | | | | | | |
| | La | Ce | Pr | Nd | a [Ni] | [Co] | c [Al] | [Mn] | [Sn] | Fe | Cu | Ti | Zr | Nb | | | | |
| Ex. 14 | 54.00 | 32.85 | 3.29 | 9.86 | 4.40 | 0.05 | 0.40 | 0.05 | 0.05 | — | — | — | — | — | 0.10 | 0.10 | 4.95 | Metal mold |
| Ex. 15 | | | | | 4.40 | 0.30 | 0.00 | 0.15 | 0.15 | — | — | — | — | — | 0.45 | 0.30 | 5.00 | Metal mold |
| Ex. 16 | 60.00 | 28.57 | 2.86 | 8.57 | 4.25 | 0.30 | 0.45 | 0.05 | 0.10 | — | — | — | — | — | 0.40 | 0.15 | 5.15 | Metal mold |
| Ex. 17 | | | | | 4.25 | 0.30 | 0.40 | 0.00 | 0.05 | — | — | — | — | — | 0.35 | 0.05 | 5.00 | Metal mold |
| Ex. 18 | 66.00 | 24.28 | 2.43 | 7.29 | 4.15 | 0.30 | 0.40 | 0.05 | 0.10 | 0.1 | — | — | — | — | 0.40 | 0.15 | 5.10 | Metal mold |
| Ex. 19 | | | | | 4.05 | 0.30 | 0.40 | 0.10 | 0.10 | — | 0.15 | — | — | — | 0.40 | 0.20 | 5.10 | Metal mold |
| Ex. 20 | | | | | 4.35 | 0.15 | 0.40 | 0.05 | 0.10 | — | — | 0.05 | — | — | 0.25 | 0.15 | 5.10 | Metal mold |
| Ex. 21 | 67.00 | 23.57 | 2.36 | 7.07 | 4.35 | 0.15 | 0.40 | 0.05 | 0.10 | — | — | — | 0.05 | — | 0.25 | 0.15 | 5.10 | Metal mold |
| Ex. 22 | | | | | 4.25 | 0.30 | 0.40 | 0.05 | 0.10 | — | — | — | — | 0.05 | 0.40 | 0.15 | 5.15 | Metal mold |
| Ex. 23 | 75.00 | 17.00 | 2.00 | 6.00 | 4.40 | 0.15 | 0.40 | 0.05 | 0.10 | — | — | — | — | — | 0.25 | 0.15 | 5.10 | Metal mold |
| Ex. 24 | 82.00 | 12.85 | 1.29 | 3.86 | 4.26 | 0.30 | 0.20 | 0.19 | 0.05 | — | — | — | — | — | 0.35 | 0.24 | 5.00 | Metal mold |
| Ex. 25 | 85.00 | 11.49 | 0.88 | 2.63 | 4.30 | 0.25 | 0.25 | 0.15 | 0.05 | — | — | — | — | — | 0.35 | 0.25 | 5.05 | Metal mold |
| Ex. 26 | 73.00 | 27.00 | 0.00 | 0.00 | 4.36 | 0.30 | 0.20 | 0.19 | 0.05 | — | — | — | — | — | 0.35 | 0.24 | 5.10 | Metal mold |
| Ex. 27 | 80.00 | 20.00 | 0.00 | 0.00 | 4.25 | 0.30 | 0.30 | 0.13 | 0.07 | — | — | — | — | — | 0.37 | 0.20 | 5.05 | SC |
| Ex. 28 | 100.00 | 0.00 | 0.00 | 0.00 | 4.45 | 0.34 | 0.25 | 0.05 | 0.06 | — | — | — | — | — | 0.40 | 0.11 | 5.15 | Metal mold |
| Ex. 29 | 100.00 | 0.00 | 0.00 | 0.00 | 4.45 | 0.34 | 0.25 | 0.05 | 0.06 | — | — | — | — | — | 0.40 | 0.11 | 5.15 | SC |
| Comp. Ex. 1 | 66.00 | 24.28 | 2.43 | 7.29 | 4.25 | 0.30 | 0.40 | 0.15 | 0.00 | — | — | — | — | — | 0.30 | 0.15 | 5.10 | Metal mold |
| Comp. Ex. 2 | | | | | 4.25 | 0.30 | 0.40 | 0.15 | 0.30 | — | — | — | — | — | 0.60 | 0.45 | 5.40 | SC |
| Comp. Ex. 3 | 67.00 | 23.57 | 2.36 | 7.07 | 4.25 | 0.25 | 0.40 | 0.25 | 0.10 | — | — | — | — | — | 0.35 | 0.35 | 5.25 | Metal mold |
| Comp. Ex. 4 | 54.00 | 32.85 | 3.29 | 9.86 | 4.40 | 0.00 | 0.40 | 0.05 | 0.10 | — | — | — | — | — | 0.10 | 0.15 | 4.95 | Metal mold |
| Comp. Ex. 5 | 67.00 | 23.57 | 2.36 | 7.07 | 4.25 | 0.60 | 0.40 | 0.05 | 0.10 | — | — | — | — | — | 0.70 | 0.15 | 5.40 | Metal mold |
| Comp. Ex. 6 | 54.00 | 32.85 | 3.29 | 9.86 | 4.25 | 0.05 | 0.40 | 0.15 | 0.00 | — | — | — | — | — | 0.05 | 0.15 | 4.85 | SC |
| Comp. Ex. 7 | | | | | 4.25 | 0.05 | 0.50 | 0.05 | 0.10 | — | — | — | — | — | 0.15 | 0.15 | 4.95 | Metal mold |
| Comp. Ex. 8 | 80.00 | 16.49 | 0.88 | 2.63 | 4.15 | 0.30 | 0.30 | 0.15 | 0.15 | — | — | — | — | — | 0.45 | 0.30 | 5.05 | Metal mold |
| Comp. Ex. 9 | 52.00 | 33.72 | 3.57 | 10.71 | 4.25 | 0.30 | 0.40 | 0.00 | 0.02 | — | — | — | — | — | 0.32 | 0.02 | 4.97 | Metal mold |
| Comp. Ex. 10 | 86.90 | 9.6 | 0.9 | 2.6 | 4.45 | 0.15 | 0.30 | 0.40 | 0.00 | — | — | — | — | — | 0.15 | 0.40 | 5.30 | Metal mold |
| Comp. Ex. 11 | 86.90 | 9.6 | 0.9 | 2.6 | 4.45 | 0.15 | 0.30 | 0.40 | 0.00 | — | — | — | — | — | 0.15 | 0.40 | 5.30 | SC |
| Comp. Ex. 12 | 86.90 | 9.6 | 0.9 | 2.6 | 4.45 | 0.15 | 0.30 | 0.30 | 0.10 | — | — | — | — | — | 0.25 | 0.40 | 5.30 | Metal mold |
| Comp. Ex. 13 | 86.90 | 9.6 | 0.9 | 2.6 | 4.45 | 0.15 | 0.30 | 0.30 | 0.10 | — | — | — | — | — | 0.25 | 0.40 | 5.30 | SC |

TABLE 2

| | Total elution (ppm) | Decrepitation residual rate (%) | Oxidation resistance (ppm) | Capacity ratio (%) |
|---|---|---|---|---|
| Ex. 1 | 930 | 88 | 4700 | 99 |
| Ex. 2 | 1050 | 86 | 5500 | 98 |
| Ex. 3 | 695 | 86 | 5450 | 98 |
| Ex. 4 | 850 | 87 | 4800 | 99 |
| Ex. 5 | 1040 | 91 | 4450 | 100 |
| Ex. 6 | 740 | 90 | 4500 | 100 |
| Ex. 7 | 785 | 84 | 5500 | 97 |
| Ex. 8 | 615 | 84 | 5650 | 97 |
| Ex. 9 | 695 | 86 | 6900 | 99 |
| Ex. 10 | 730 | 85 | 5750 | 98 |
| Ex. 11 | 690 | 87 | 5450 | 99 |
| Ex. 12 | 700 | 83 | 5900 | 97 |
| Ex. 13 | 950 | 93 | 4350 | 100 |
| Ex. 14 | 730 | 82 | 5550 | 96 |
| Ex. 15 | 570 | 84 | 5500 | 97 |
| Ex. 16 | 985 | 88 | 4850 | 99 |
| Ex. 17 | 940 | 87 | 4950 | 99 |
| Ex. 18 | 915 | 89 | 4600 | 100 |
| Ex. 19 | 980 | 89 | 4650 | 99 |
| Ex. 20 | 680 | 87 | 5200 | 98 |
| Ex. 21 | 690 | 86 | 5500 | 98 |
| Ex. 22 | 915 | 89 | 4650 | 99 |
| Ex. 23 | 730 | 86 | 7000 | 94 |
| Ex. 24 | 880 | 80 | 6100 | 95 |
| Ex. 25 | 850 | 81 | 6000 | 96 |
| Ex. 26 | 890 | 82 | 5500 | 97 |
| Ex. 27 | 860 | 81 | 5800 | 96 |
| Ex. 28 | 950 | 78 | 6600 | 94 |
| Ex. 29 | 930 | 80 | 6450 | 95 |
| Comp. Ex. 1 | 1430 | 60 | 7200 | 91 |
| Comp. Ex. 2 | 1380 | 84 | 5550 | 97 |
| Comp. Ex. 3 | 1350 | 83 | 5600 | 97 |
| Comp. Ex. 4 | 460 | 51 | 11000 | 83 |
| Comp. Ex. 5 | 1500 | 93 | 4250 | 100 |
| Comp. Ex. 6 | 1020 | 47 | 12100 | 82 |
| Comp. Ex. 7 | 650 | 49 | 11500 | 84 |

TABLE 2-continued

| | Total elution (ppm) | Decrepitation residual rate (%) | Oxidation resistance (ppm) | Capacity ratio (%) |
|---|---|---|---|---|
| Comp. Ex. 8 | 800 | 52 | 11200 | 81 |
| Comp. Ex. 9 | 1320 | 62 | 7350 | 88 |
| Comp. Ex. 10 | 1522 | 55 | 10200 | 86 |
| Comp. Ex. 11 | 1564 | 68 | 7210 | 93 |
| Comp. Ex. 12 | 1090 | 84 | 6670 | 94 |
| Comp. Ex. 13 | 1100 | 88 | 4890 | 99 |

What is claimed is:

1. A hydrogen storage alloy comprising a $CaCu_5$ crystal phase as a main phase, having a composition represented by the formula $RNi_aCo_bAl_cMn_dSn_eM_f$ wherein R comprises at least La, Ce, Pr, and Nd, with a content of La being not less than 66 mass % and not more than 85 mass %, a content of Ce being not less than 5 mass % and not more than 55 mass %, a content of Pr being not less than 0.1 mass % and not more than 10 mass %, and a content of Nd being not less than 0.1 mass % and not more than 7.29 mass %; M stands for at least one element selected from Ti, Zr, Hf, Ag, Ge, V, Nb, Ta, Cr, Mo, W, Fe, Cu, Zn, B, Ga, Sb, In, Si, P, and C; a satisfies $3.70 \leq a \leq 5.10$, b satisfies $0 < b \leq 0.55$, c satisfies $0.00 \leq c \leq 0.45$, d satisfies $0.05 \leq d < 0.20$, e satisfies $0.05 \leq e \leq 0.25$, and f satisfies $0.00 \leq f \leq 0.25$; and $4.90 \leq a+b+c+d+e+f \leq 5.50$, and having a structure free of a precipitated phase with a grain diameter of not less than 5.0 μm as observed in Sn- and La-mapping images at a magnification of 800× obtained by area analysis of a cross-sectional structure of said alloy with an electron probe micro analyzer.

2. The hydrogen storage alloy according to claim 1, wherein b satisfies $0 < b \leq 0.50$.

3. The hydrogen storage alloy according to claim 2, wherein b satisfies $0.10 \leq b \leq 0.30$.

4. The hydrogen storage alloy according to claim 1, wherein e satisfies $0.05 \leq e \leq 0.15$.

5. The hydrogen storage alloy according to claim 1, wherein b+e satisfies $0.10 \leq b+e \leq 0.65$.

6. The hydrogen storage alloy according to claim 5, wherein b+e satisfies $0.15 \leq b+e \leq 0.45$.

7. The hydrogen storage alloy according to claim 1, wherein d+e satisfies $0.10 \leq d+e \leq 0.30$.

8. An anode for a nickel-hydrogen rechargeable battery comprising the hydrogen storage alloy of claim 1 as an anode active material.

9. A nickel-hydrogen rechargeable battery comprising the anode for a nickel-hydrogen rechargeable battery of claim 8.

* * * * *